J. D. INGRAM.
VEHICLE WHEEL.
APPLICATION FILED NOV. 20, 1911.
1,068,660.
Patented July 29, 1913.
2 SHEETS—SHEET 1.
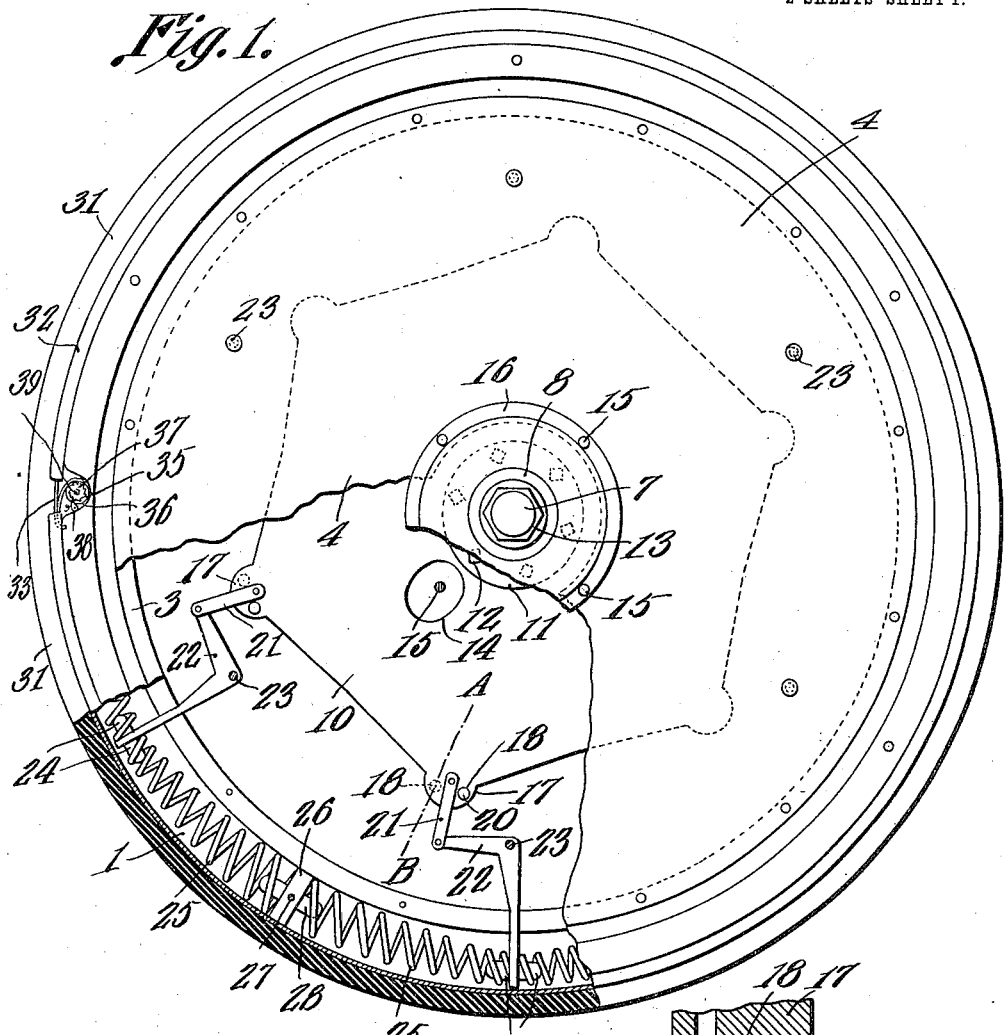
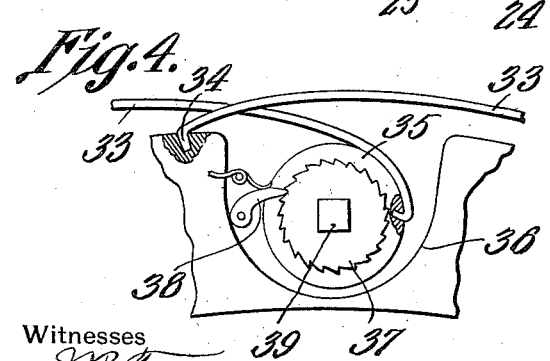
Witnesses
Joseph D. Ingram,
Inventor
by C. A. Snow & Co.
Attorneys

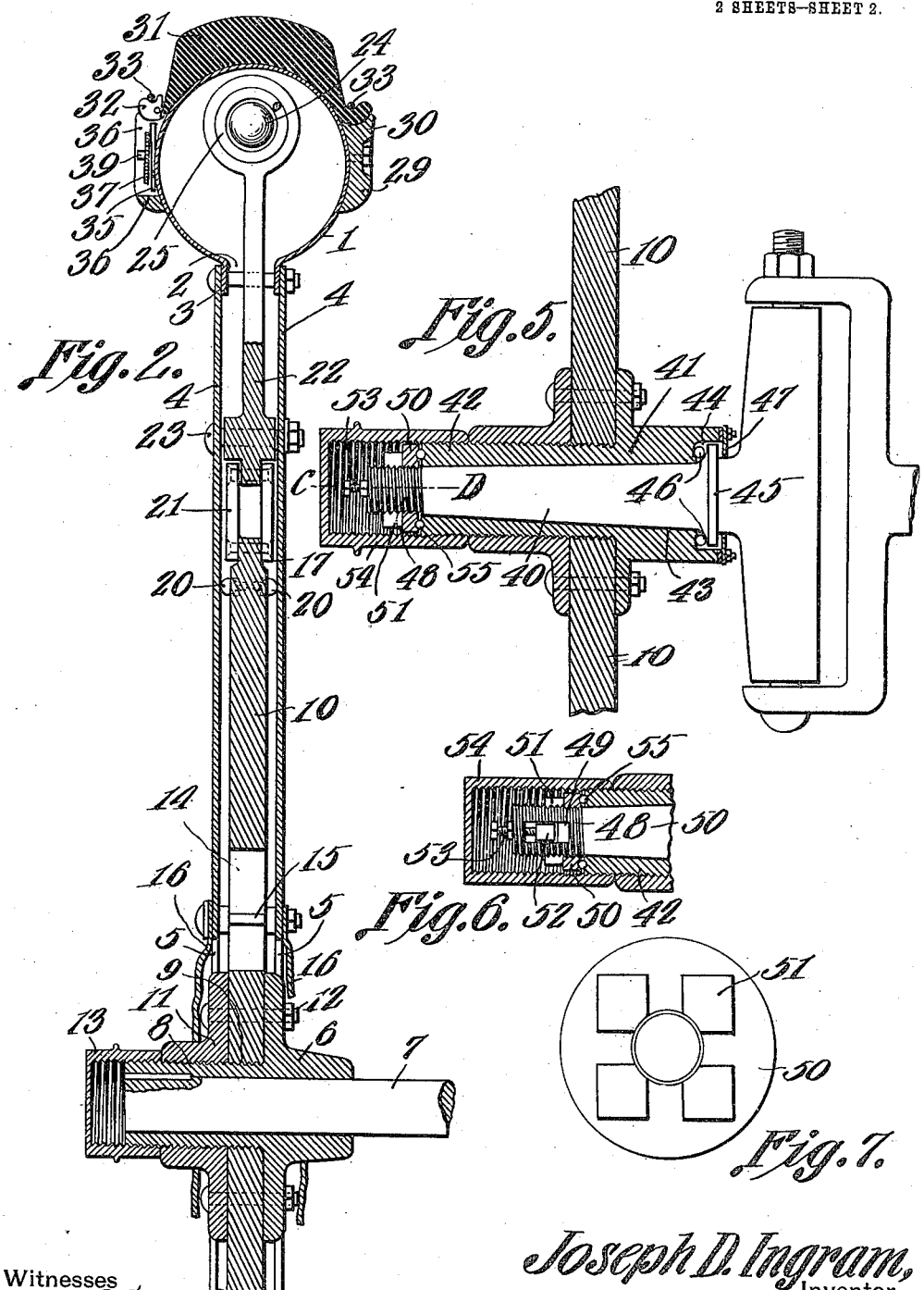

UNITED STATES PATENT OFFICE.

JOSEPH D. INGRAM, OF WASHBURN, TEXAS.

VEHICLE-WHEEL.

1,068,660.  Specification of Letters Patent.  Patented July 29, 1913.

Application filed November 20, 1911. Serial No. 661,233.

*To all whom it may concern:*

Be it known that I, JOSEPH D. INGRAM, a citizen of the United States, residing at Washburn, in the county of Armstrong and State of Texas, have invented a new and useful Vehicle-Wheel, of which the following is a specification.

This invention relates to spring wheels for vehicles, one of its objects being to provide a wheel of this type having all of the advantages of the ordinary wheel provided with a pneumatic tire, there being a novel arrangement of springs arranged within the rim portion of the wheel and adapted to be placed simultaneously under compression when the wheel is subjected to a load or is jolted.

A further object is to provide a wheel of this type all working parts of which are concealed and are protected from dirt and moisture.

Another object is to provide a wheel having improved means for attaching a resilient tire thereto.

A further object is to provide improved means for securing the wheel to an axle.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings: Figure 1 is a view partly in side elevation and partly in section of a wheel embodying the present improvements. Fig. 2 is an enlarged transverse section through a portion of the wheel. Fig. 3 is an enlarged section on line A—B Fig. 1. Fig. 4 is an enlarged side elevation of a portion of the rim and showing one of the tire tightening devices. Fig. 5 is an enlarged longitudinal section through the means employed for connecting the wheel to a spindle. Fig. 6 is a section on line C—D, Fig. 5, the locking lug and the spindle being shown in elevation. Fig. 7 is an enlarged elevation of the nut used in securing the wheel to a spindle.

Referring to the figures by characters of reference 1 designates the tubular rim of the wheel, the same having an annular slot 2 in the innermost portion thereof, there being parallel annular flanges 3 along the walls of the slots and extending inwardly toward the center of the wheel. Oppositely disposed similar disks 4 are riveted or otherwise secured to these flanges and each disk is provided, at its center, with a large opening 5. A hub 6 is keyed or otherwise secured to an axle 7 and has an exteriorly screw threaded tubular extension 8 fitted on the axle and projecting through and engaging the walls of an opening 9 formed in the center of the middle disk 10 of the wheel. This disk is preferably hexagonal and is clamped upon the hub 6 by a hub section 11 which is screwed onto the extension 8, said section being attached to the disk 10 and hub 6 by means of bolts 12 extending through them. A screw cap 13 may be placed in engagement with the projecting end portion of extension 8, as shown in Fig. 2.

A series of openings 14 are formed in the middle disk 10 close to the hub 6 and extending through these openings are connecting bolts 15 secured to the disks 4 close to the central openings 5 therein. These bolts not only constitute connections between the middle portions of the disks 4 but also serve to secure flexible disks 16 to the disks 4, said flexible disks being formed of rubber or other suitable material and being extended around the hub 6 and the hub sections 11 respectively so as to prevent the admission of dust or moisture to the openings 5.

An ear or extension 17 is formed at each angle of the middle disk 10 and is formed, in opposed faces, with sockets 18 each of which contains a thrust ball 19 and a larger spacing ball 20, the last mentioned ball being adapted to contact with the adjacent disk 4 and thus hold the middle disk 10 spaced therefrom.

A link 21 is pivotally connected to each extension 17 and to one arm of a bell crank lever 22 fulcrumed upon a bolt 23 which is secured to the disks 4 at a point removed from the middle disk 10. The long arms of the bell crank levers extend between the flanges 3 and through the slots 2, the outer ends of these arms being provided with oppositely extending studs 24 projecting into the ends of tapered coiled springs 25 seated within the tubular rim 1. These studs project into the small ends of the springs and the large ends of said springs abut against spacing blocks 26 which are secured within the rim 1 by means of transversely extending bolts 27 or the like, there being studs 28 extending from the blocks and into the adjacent convolutions of the springs 25. Thus it will be seen that between every two blocks 26 is a pair of oppositely disposed tapered coiled springs, the long arm of each bell crank lever 22 being extended between the springs of each pair. All of the springs are of the same strength and under ordinary conditions bear with equal pressure against both sides of the lever arm extending therebetween.

Rings 29 are secured to the rim 1 at diametrically opposed points, the outer edges of these rings being concaved transversely to form seats 30 adapted to receive the side portions of a tire 31 of rubber or the like. These side portions of the tire are preferably in the form of annular flanges, as indicated at 32, each flange being adapted to be engaged by a wire 33 which extends around the wheel and is secured at one end to the ring 29, as shown at 34 while its other end is attached to a disk 35 journaled within a recess 36 in one side of the ring 29. A ratchet wheel 37 is secured to and rotates with the disk 35 and is normally engaged by a spring pressed pawl 38 whereby rotation of the disk and ratchet wheel in one direction is prevented. An angular stud or projection 39 extends from the center of the wheel 37 and is adapted to be engaged by a crank, not shown, whereby the ratchet wheel 37 and disk 35 can be rotated so as to wind one end portion of wire 33 upon the disk. It will be apparent that, by thus winding the wire, it can be tightened on the flange 32 engaged thereby and said flange will thus be tightly bound upon the seat 30 engaged thereby. It will be apparent that by providing each of the rings 29 with tire securing means such as described, it will be impossible for the tire to become displaced relative to the wheel rim.

It will be apparent, from the foregoing, that when the rim 1 is shifted relative to the axle 7, the bell crank levers 22 will swing about their fulcrums 23 and will simultaneously compress the springs 25 in the paths thereof, these springs thus serving to retard the movement and therefore producing a cushioning effect similar to that obtained by the use of an ordinary pneumatic tire. In view of the fact that the disk 10 is spaced from the outer disks 4 by anti-friction devices 20 it will be seen that the said disks can move relative to each other without producing undesirable friction. Furthermore as all of the working parts of the wheel are housed they are fully protected from dust and moisture.

Where the wheel is to be attached to spindles 40 such as used in connection with the steering wheels of a motor vehicle, the means employed for attaching the wheels to the spindles are somewhat different from those heretofore described. As shown in Figs. 5, 6 and 7 the hub 41 and its extension 42 has a tapered bore 43 for the reception of the spindle 40, one end of the hub being counter bored as at 44 to receive a collar 45 on the spindle and also to receive anti-friction balls 46. A washer 47 of leather or the like may be secured to the end of the hub and projects back of the collar 45 so as to prevent the admission of dust and moisture to the race in which the balls 46 are mounted. The threaded end 48 of the spindle 40 has a slot 49 extending radially therethrough and the nut 50 engaging the threaded end of the spindle has spaced lugs 51 extending from its outer face. A key 52 is insertible through slot 49 and its ends are adapted to be seated between the lugs 51, the said key being held in such position by a set screw 53 which enters the end of the spindle and extends into the slot 49. A dust cap 54 preferably engages the hub 41 and incloses the slotted portion of the spindle and the parts coöperating therewith. Anti-friction balls 55 may be interposed between the nut 50 and extension 42.

What is claimed is:—

1. A spring wheel including a tubular rim having an inner annular slot, side disks secured to the rim and spaced apart, a hub extending through openings in the centers of the disks and spaced from the walls of the openings, a middle disk secured to the hub and arranged between the side disks, said middle disk having segmental ears outstanding from the periphery thereof, bell crank levers fulcrumed between the side disks and between the rim and the middle disk, one arm of each lever projecting into the rim, springs housed in the rim for retarding the movements of the bell crank levers, and link connections between the levers and the ears.

2. A spring wheel including a tubular rim having an inner annular slot, disks secured thereto, a hub extending loosely through the disks, a middle disk secured to the hub and between the side disks, ears outstanding from the periphery of the middle disk, links pivotally connected to the ears, bell crank levers supported by the side disks and between the middle disk and the rim, one arm of each lever projecting into the rim, springs housed in the rim for controlling the movements of the levers, spacing balls carried by the ears and contacting with the respective side disks, and thrust balls interposed between the ears and the spacing balls.

In testimony that I claim the foregoing as my own, I have hereto affixed my signature in the presence of two witnesses.

JOSEPH D. INGRAM.

Witnesses:
CHAS. J. E. LOWNDES,
J. S. CHESNUTT.